United States Patent [19]
Shimizu

[11] Patent Number: 5,917,309
[45] Date of Patent: Jun. 29, 1999

[54] CHARGER FOR ELECTRICALLY CHARGING A CAPACITOR

[75] Inventor: Tatsuhiko Shimizu, Toyota, Japan

[73] Assignee: Toyota Jidosha Kabushiki Kaisha, Toyota, Japan

[21] Appl. No.: 09/022,621

[22] Filed: Feb. 12, 1998

[30] Foreign Application Priority Data

Feb. 19, 1997 [JP] Japan .................................. 9-035220

[51] Int. Cl.⁶ ........................ H01M 10/44; H01M 10/46
[52] U.S. Cl. ............................................................ 320/166
[58] Field of Search ................................. 320/166, 167, 320/150, FOR 100; 361/274.1, 303, 311, 328; 429/188, 193

[56] References Cited

U.S. PATENT DOCUMENTS

| | | | |
|---|---|---|---|
| 4,713,731 | 12/1987 | Boos et al. | 361/433 |
| 5,549,989 | 8/1996 | Anani | 429/193 |
| 5,742,474 | 4/1998 | Shimizu et al. | 361/502 |

FOREIGN PATENT DOCUMENTS

| | | |
|---|---|---|
| 59-48916 | 3/1984 | Japan . |
| 6-140286 | 5/1994 | Japan . |
| 6-302472 | 10/1994 | Japan . |

*Primary Examiner*—Edward H. Tso
*Attorney, Agent, or Firm*—Kenyon & Kenyon

[57] ABSTRACT

A charger includes a control unit, which provides the capacitor with electricity, and charges the capacitor. While charging is being executed, the stored charge will increase, and each of the potentials of the positive electrode and the negative electrode will increase. The potential of the positive electrode V+, the potential of the negative electrode V−, the decomposition potential of the positive electrode, and the decomposition potential of the negative electrode are compared with each other. At first, both the potential of the positive electrode and the potential of the negative electrode are smaller than the decomposition potentials. During charging, if it is detected that at least one of the potentials of the positive electrode or the negative electrode reaches the decomposition potential, the control unit stops charging.

19 Claims, 8 Drawing Sheets

CHARGER FOR ELECTRICALLY CHARGING A CAPACITOR

BACKGROUND OF THE INVENTION

1. Field of the Invention

The present invention is directed to a charger for a capacitor, which charger supplies electricity to the capacitor, and also a charging method for a charging a capacitor.

2. Related Art

Electrical double layer capacitors have been known as capacitors to store electrical energy. Examples of such electrical double layer capacitors are shown and described in Japanese Patent Laid-Open Publications No. SHO 59-48916, No. HEI 6-140286, and No. HEI 6-302472.

Figure 1:
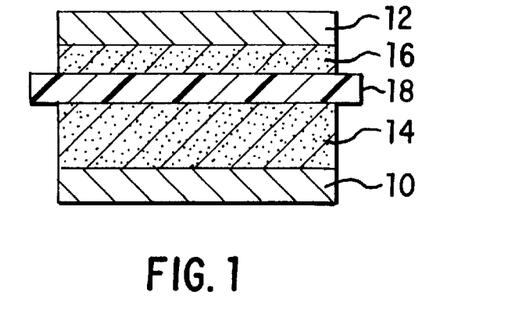
FIG. 1 is a cross section of an electric double layer capacitor.

The electric double layer capacitors have been used as power sources for various electrical devices and have been considered for use as power sources for electrical-powered vehicles. To use the electrical double layer capacitors as power sources, it is desirable that they be of a small size. To make them small requires increasing the amount of the electrical energy capacity. An electrical double layer capacitors has electrical characteristics similar to those of a condenser, and its energy capacity E is expressed by ½ QV ($E = \frac{1}{2} QV$). In this formula, Q represents electric charge (Q), and V represents electric voltages between terminals. According to above mentioned formula, increasing the energy capacity can be achieved by increasing the electrical voltages between terminals. In Japanese Application No. HEI 7-180034 by the present assignee, taking into account this point, an electrical double layer capacitor is disclosed that can be used in higher electrical voltage applications than previously possible. FIG. 1 shows a cross section of an electrical double layer capacitor drawn in the above mentioned application. In FIG. 1, a collector 10 accompanies a polarized positive electrode 14 (called the "positive electrode 14") while a collector 12 accompanies a polarized negative electrode 16 (called the "negative electrode 16"). These positive and negative electrodes 14 and 16 include activated carbon and carbon black, which are caked using polytetrafluoroethylene (PTFE) as a binder. The carbon black is effective in enhancing the conductivity of the polarized electrodes. Each of the collectors 10 and 12 is made of aluminum foil. The positive and negative electrodes 14 and 16 are coated on the aluminum foil as the collectors 10 and 12, and then they are baked after being pressed. A separator 18, which is made of a polyolefin-based porous film, is interposed between the positive and negative electrodes 14 and 16. The positive and negative electrodes 14, 16, and the separator 18 are saturated with electrolyte, which contains one mol/liter of tetraethyl ammonium tetrafluoroborate ($Et_4N \cdot BF_4$) dissolved in a solvent of propylene carbonate.

In conventional electrical double layer capacitors, the capacitance of the positive electrode and the capacitance of the negative electrode are set approximately to the same value. On the other hand, in Japanese Application No. HEI 7-180034, the capacitance of the positive electrode and the capacitance of the negative electrode are set to different values as follows.

Hereinafter, the potential of the positive electrode is used as a standard when the positive and negative electrodes are shorted and completely discharged. The difference between the standard and the electric potential of the positive electrode is set as the "positive potential" and the difference between the standard and the electric potential of the negative electrode is set as the "negative potential." The potential, when an irreversible current is caused in the capacitor, is called the "decomposition potential." This decomposition potential is a characteristic value, which is determined based on the electrochemistry.

During charging, with an increase in the applied voltage as the potential rises over the decomposition potential, an irreversible current is caused due to the electrochemical decomposition of the electrolyte. The generation of the irreversible current causes the performance and lifetime of the capacitor to degrade. Therefore, it is necessary to maintain the positive potential and negative potential below the decomposition potential.

The inventors have noted that the positive and negative electrodes have different decomposition potentials when the irreversible current is caused. Also a ratio of the capacitance of the positive electrode to the capacitance of the negative electrode is set to the same or approximately the same reciprocal ratio of the decomposition potential.

SUMMARY OF THE INVENTION

The present invention provides a charger for a capacitor and a charging technique for the capacitor that is able to be used when taking into account the change of the characteristic of the capacitor. In other words, the present invention is to provide a charger for a capacitor and a charging technique for capacitor that is used, when taking into account the change of the decomposition potential, under as high voltage as possible with no irreversible current being caused. Mainly, the decomposition potential is changed based on the change of the temperature of the capacitor, so the capacitor is used while taking into account the change of temperature of the capacitor. In other words, the present invention is to provide a charger for a capacitor and charging technique for the capacitor, which do not cause the irreversible current even if the ratio of the capacitance of the positive electrode to the capacitance of the negative electrode is changed by some cause, and which execute appropriate charging corresponding to the change of the ratio of the capacitance. A charger built according to the present invention is described in the following. At the initiation of charging, the control unit of the charger provides the capacitor with electricity, and charging is executed. As charging is executed, the stored charge will increase, and each the potential of the positive electrode and the potential of the negative electrode will increase. The potential of the positive electrode V+, the potential of the negative electrode V-, the decomposition potential of the positive electrode, and the decomposition potential of the negative electrode are compared with each other. At first, both the potential of the positive electrode or the potential of the negative electrode are smaller than the decomposition potentials. During charging, if it is detected that at least one of the potentials of the positive electrode and the potential of the negative electrode reaches the decomposition potential, the control unit stops charging.

According to the present invention, the potential between the positive electrode and the negative electrode, the decomposition potential of the positive electrode, or the decomposition potential of the negative electrode is used to control charging.

According to the present invention, it is possible to get the maximum amount of the charging energy with no irreversible current being caused.

DETAILED DESCRIPTION

The present invention will be described more specifically with reference to the accompanying drawings.

The inventors have noted that the positive and negative electrodes have different decomposition potentials when the irreversible current is caused. And a ratio of the capacitance of the positive electrode to the capacitance of the negative electrode is set to the same or approximately the same reciprocal ratio of the decomposition potential. For example, assuming that the decomposition potential of the positive electrode is +0.7 V, and the decomposition potential of the negative electrode is −1.8 V, at standard temperature, 25° C., the ratio of the capacitance of the positive electrode to the negative electrode, (C+):(C−) is set to 1.8:0.7. Here (C+) indicates the capacitance of the positive electrode, and (C−) indicates the capacitance of the negative electrode. The ratio of the capacitance of the positive electrode to that of the negative electrode can be changed by modifying the "quantitative value" of the positive electrode and the negative electrode. The quantitative value is the amount of the activated material, such as activated carbon or carbon black, per unit area (1 cm$^2$). The capacitance is proportional to the "quantitative ratio," which is the ratio of the quantitative value of the positive electrode and the quantitative value of the negative electrode. So, if the quantitative ratio, positive electrode:negative electrode, is set as 1.8:0.7, the ratio of the capacitance will be the same as the quantitative ratio.

Figure 2:
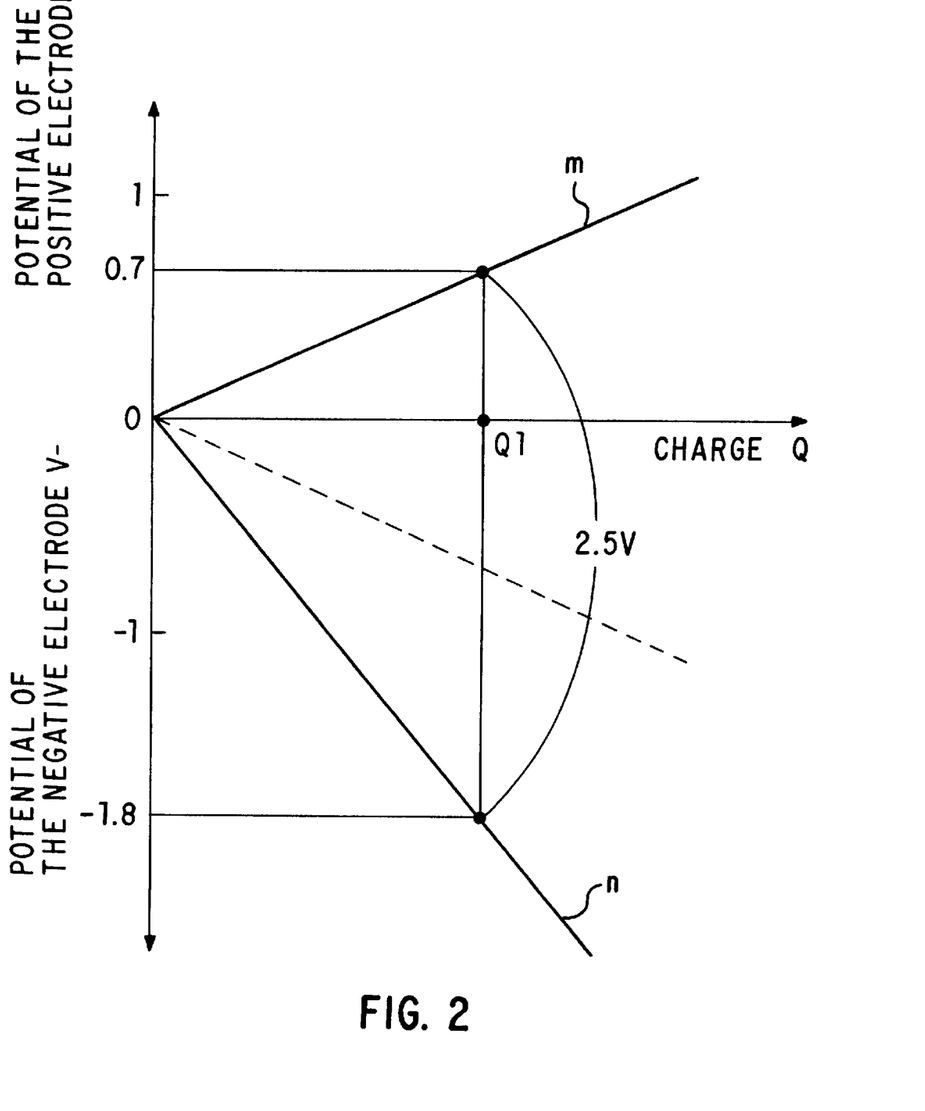
FIG. 2 shows the relationship between the stored charge Q (horizontal axis of the graph) and the positive potential or negative potential (vertical axis of the graph) of the electric double layer capacitor shown in FIG. 1.

FIG. 2 shows the relationship between the stored charge Q (horizontal axis of the graph) and the positive potential or negative potential (vertical axis of the graph) of the electrical double layer capacitor. The positive potential V+ and charge Q have a relationship of (V+)=Q/(C+). And the negative potential V− and charge Q have a relationship of (V−)=Q/(C−). Because (C+) is larger than (C−), i.e., (C+)>(C−), the slope of the straight line (m) of the positive electrode side is smaller than the slope of the straight line (n) of the negative electrode, and the ratio of the slope is 1/(C+):1/(C−)=0.7:1.8.

At the capacitor, in principal, the absolute value of stored charge Q of the positive electrode and the negative electrode are the same. Therefore, if the capacitor shown in FIG. 1 is charged, the positive potential and the negative potential will increase while maintaining the ratio fixed, 0.7:1.8. And when the charge reaches Q1, the positive potential and the negative potential simultaneously reach their respective decomposition potentials, 0.7 V, −1.8 V. Conventionally, the capacitance of the positive electrode and the capacitance of the negative electrode are the same, therefore, the negative potential will follow the value of a dotted line shown in FIG. 2. As a result, the positive potential reaches the decomposition potential first. At that time the potential between the positive electrode and the negative electrode is approximately 1.4 V. On the other hand, in the capacitor shown in FIG. 1, the positive potential and the negative potential simultaneously reach their respective decomposition potentials. At that time, the potential between the positive electrode and the negative electrode is approximately 2.5 V (2.5=0.7+1.8). Therefore, it is possible for the capacitor shown in FIG. 1 to increase the active potential to 2.5 V. The active potential is the potential between the positive electrode and the negative electrode, which is the acceptable potential between the positive electrode and negative electrode. As mentioned before, because the capacitor shown in FIG. 1 is set to a different amount for capacitances of the positive electrode and the negative electrode, it is available for higher voltage applications than heretofore possible. By using this type of capacitor, it is now possible to make the capacitor small.

(1) The decomposition potential of the positive electrode is +0.7 V, and the decomposition potential of the negative electrode is −1.8 V, at the standard temperature, 25° C., of the capacitor. The temperature of the capacitor case, such as temperature of the electrolyte, is measured as the temperature of the capacitor. But it is noted, that if temperature of the capacitor is changed, the decomposition potential is also changed corresponding to the temperature change. The expression of the decomposition potential of the positive electrode at each temperature of the capacitor is the temperature characteristic of the positive electrode, and the expression of the decomposition potential of the negative electrode at each temperature of the capacitor is the temperature characteristic of the negative electrode.

Figure 3:
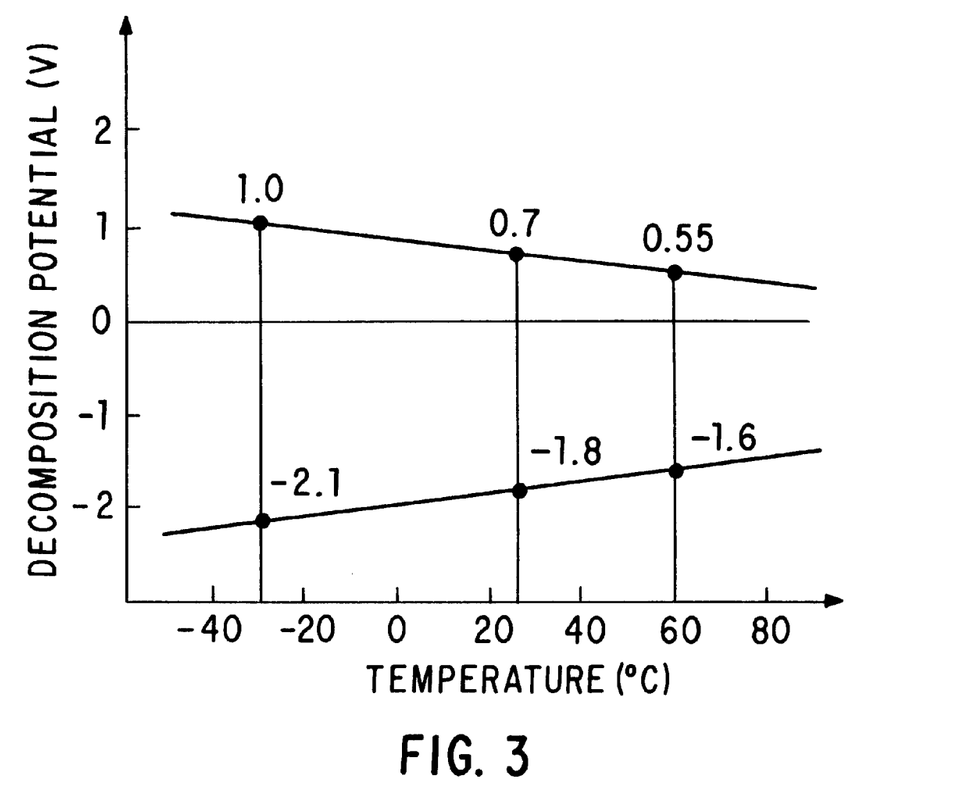
FIG. 3 shows the relationship between temperature of the capacitor (horizontal axis of the graph) and the decomposition potential of the positive electrode or the decomposition potential of the negative electrode (vertical axis of the graph).
Figure 4:
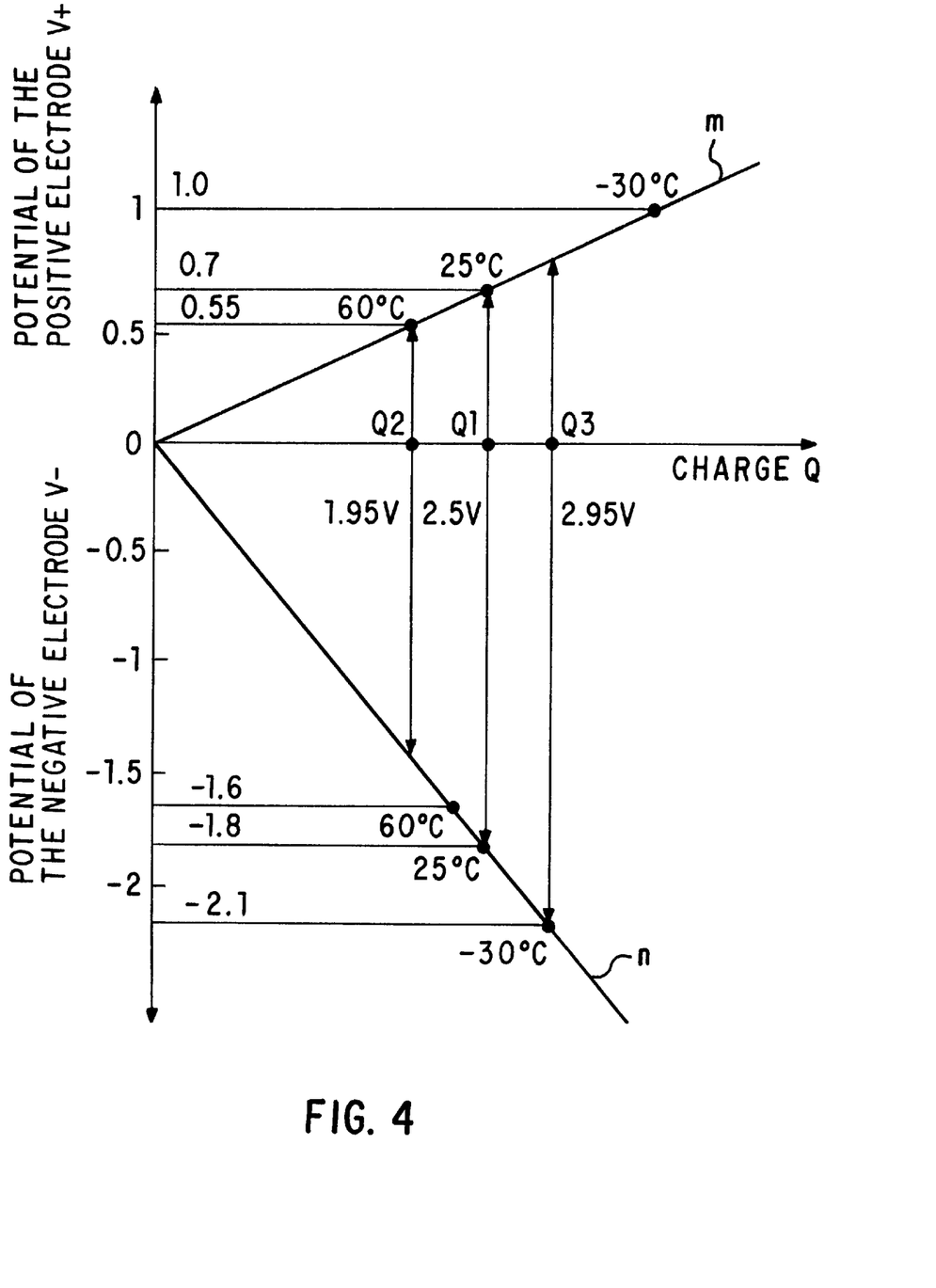
FIG. 4 shows that the decomposition potentials of positive and negative electrode at each temperature (25° C., 60° C., −30° C.) as plotted on the two straight lines (m) and (n), which are also shown in FIG. 2.

FIG. 3 shows the relationship between the temperature of the capacitor (horizontal axis of the graph) and the decomposition potential of the positive electrode or the decomposition potential of the negative electrode (vertical axis of the graph). The upper curve indicates the temperature characteristic curve of the positive electrode, and the lower curve indicates the temperature characteristic curve of the negative electrode. At standard temperature, 25° C., the decomposition potential of the positive electrode is 0.7 V and the decomposition potential of the negative electrode is −1.8 V. At 60° C., the decomposition potential of the positive electrode is 0.55 V and the decomposition potential of the negative electrode is −1.6 V. At −30° C., the decomposition potential of the positive electrode is 1.0 V and the decomposition potential of the negative electrode is −2.1 V. FIG. 4 shows the decomposition potentials of positive and negative electrode at each temperature (25° C., 60° C., −30° C.) plotted on two straight lines (m) and (n), which are also shown in FIG. 2. As shown in FIG. 4, the positive potential and the negative potential simultaneously reach their respective decomposition potentials, 0.7 V, −1.8 V. At that time the potential between the positive electrode and the negative electrode is approximately the same as the active potential, 2.5 V (2.5=0.7+1.8). When the temperature of the capacitor is 60° C., and when the stored charge reach Q2 during charging, the positive potential reaches its decomposition potential earlier than the negative potential. At that time the potential between the positive electrode and the negative electrode is 1.95 V. So, if charging is executed when potential between the positive electrode and the negative electrode equals the active potential, 2.5 V, the irreversible current is caused during charging. When the temperature of the capacitor is −30° C., and when stored charge reaches Q3 during charging, the negative potential reaches its decomposition potentials earlier than the positive potential. So, if charging is executed as the potential between the positive electrode and the negative electrode equals the active potential, 2.5 V, there is some room before the irreversible current is caused during charging.

As mentioned before, the decomposition potential of the conventional capacitors, including the electrical double layer capacitor shown in Japanese Application No. HEI 7-180034, is changed corresponding to the temperature of the capacitor. When either of the positive potential or negative potential reaches the decomposition potential first, the potential between the positive electrode and the negative electrode is different from the active potential which is determined based on the standard temperature. Because of this phenomenon, if the conventional charge, in other words, the potential between the positive electrode and the negative electrode is set to the same as the active potential, is executed at a higher temperature of the capacitor than the standard temperature, it is possible to create the irreversible current. And on the other hand, if the conventional charge is executed at a lower temperature of the capacitor than the standard temperature, it is possible to charge at a higher voltage than the conventional charge.

It is possible that the active potential is set to a small value based on the presumption of the maximum operation temperature of the capacitor to avoid creating the irreversible current. Although if the active potential is set to a small value, the charge voltage of the normal operation is also small and effective charge is not executed at the normal operation. So, setting the active potential to a small value is not a good way to charge.

(2) The conventional capacitors, including the electrical double layer capacitor shown in Japanese Application No. HEI 7-180034, have a possibility that a ratio of the capacitance of the positive electrode to the capacitance of the negative electrode is changed by some causes. For example, it is predicted that the activated material falls off partially from one of the electrodes, impurity material sticks to the surface of the electrodes and so on. If the ratio of the capacitance of the positive electrode to the capacitance of the negative electrode is changed, there is the following problem during charge. For example, that the activated material falls off partially from the positive electrodes and the capacitance (C+) of the positive electrode is small.

Figure 5:
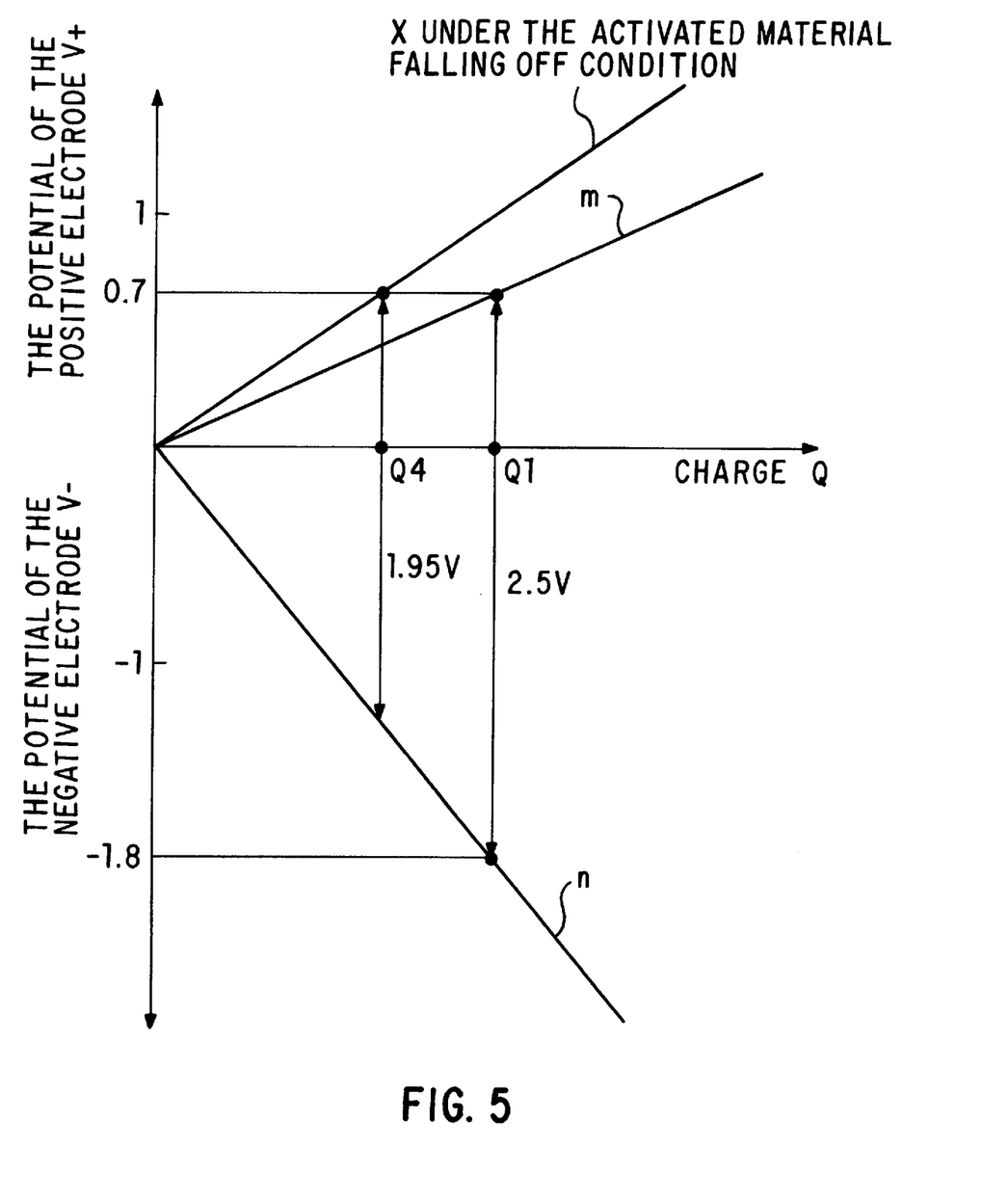
FIG. 5 shows the relationship between the stored charge Q (horizontal axis of the graph) and the positive potential or negative potential (vertical axis of the graph) of the electric double layer capacitor.

FIG. 5 shows the relationship between the stored charge Q (horizontal axis of the graph) and the positive potential or negative potential (vertical axis of the graph) of the electrical double layer capacitor. Before the activated material falls off, the relationship between stored charge Q and the positive potential is the straight line (m) as in FIGS. 2 and 4. But after the activated material falls off, the relationship between stored charge Q and the positive potential is changed to the straight line (x). Because the capacitance decreases, the slope of the straight line (x) is larger than the slope of the straight line (m).

In FIG. 5, values, corresponding to the decomposition potentials (0.7 V, −1.8V) at 25° C., temperature of the capacitor, are plotted on the straight lines (m), (n), (x). The values on the straight line (m) and (n) are the same as in FIG. 4. But on the straight line (x), the values which corresponds to the charge Q4 are plotted. Before the activated material falls off, the positive potential and the negative potential simultaneously reach their respective decomposition potential. The potential between the positive electrode and the negative electrode, is 2.5 V, which is the active potential. But after the activated material falls off, if charging is executed, the positive potential is changed corresponding to the straight line (x). When the charge reaches Q4, which is smaller than Q1 (Q4<Q1), the positive potential reaches its decomposition potential (0.7 V) first, and the potential between the positive electrode and the negative electrode is 1.95 V, as shown FIG. 5. Under the activated material falling down condition, if charging is executed until the active potential reaches 2.5 V, the charge Q will exceed the charge Q4, and the positive potential will exceed the decomposition potential, 0.7. As a result, the irreversible current is caused in the capacitor. As mentioned before, the conventional capacitors, including the electrical double layer capacitor shown in Japanese Application No. HEI 7-180034, have the following problem. It is possible that the irreversible current will be caused, if the conventional charging is executed when the ratio of the capacitance of the positive electrode to the capacitance of the negative electrode is changed by some cause.

Figure 6:
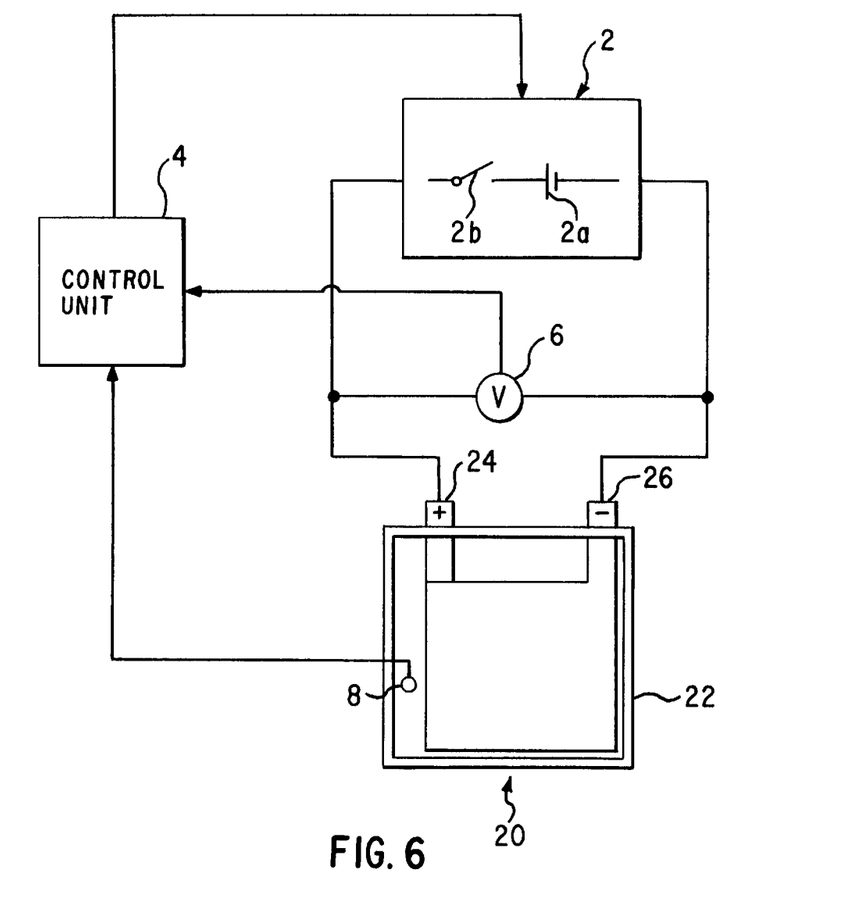
FIG. 6 shows the construction of a charger for a capacitor corresponding to the first embodiment.

FIG. 6 shows the construction of a charger for a capacitor corresponding to the first embodiment. The capacitor 20 which will be charged is an electrical double layer capacitor and has a structure as shown in FIG. 1. The capacitor is installed in a cell case made of metal. A collector 10 accompanies a polarized positive electrode 24 (called the "positive electrode 24") while a collector 12 accompanies a polarized negative electrode 16 (called the "negative electrode 26").

Figure 7:
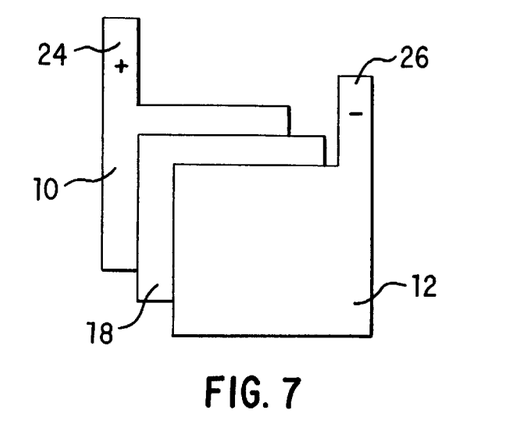
FIG. 7 shows the construction of the capacitor corresponding to the condition of FIG. 5.

FIG. 7 shows a top view of the capacitor in FIG. 1. In other words, the collector 10 accompanied by a polarized positive electrode 24, a separator 18, and collector 12 accompanies a polarized negative electrode 26 are combined in this order in the direction of the front to back of this paper. FIG. 7 shows the combination of these parts. The charger for the capacitor has an electrical power source unit 2 and a control unit 4. The electrical power source unit 2 includes an electrical power source 2a and a main switch 2b. When charging is executed, the electrical power source 2 is connected to the positive electrode 24 and negative electrode 26 of the capacitor as shown in FIG. 6. The control unit 4 controls the electrical power source unit 2. If the control unit 4 sends a "ON" signal to the electrical power unit, the main switch 2b will turn on and start to charge. If the control unit 4 sends a "OFF" signal, the main switch 2b will turn off and finish charging. The control unit 4 controls the electrical power source, such as the amount of voltage which is charged between the electrodes of the capacitor and the amount of current which is charged from the electrical power unit 2 to the capacitor 20. A voltmeter 6 measures the potential between the positive electrode 24 and the negative electrode 26 (called the potential between the electrodes) and sends measured values to the control unit 4. A temperature sensor has a thermocouple and is installed inside of the cell case 22. The temperature sensor 8 measures the temperature of electrolyte as temperature of the capacitor and sends the data of the temperature of the capacitor to the control unit 4. The control unit 4 controls the electric power source unit 2 based on the data of the potential between the electrodes and the temperature of the capacitor.

Figure 8:
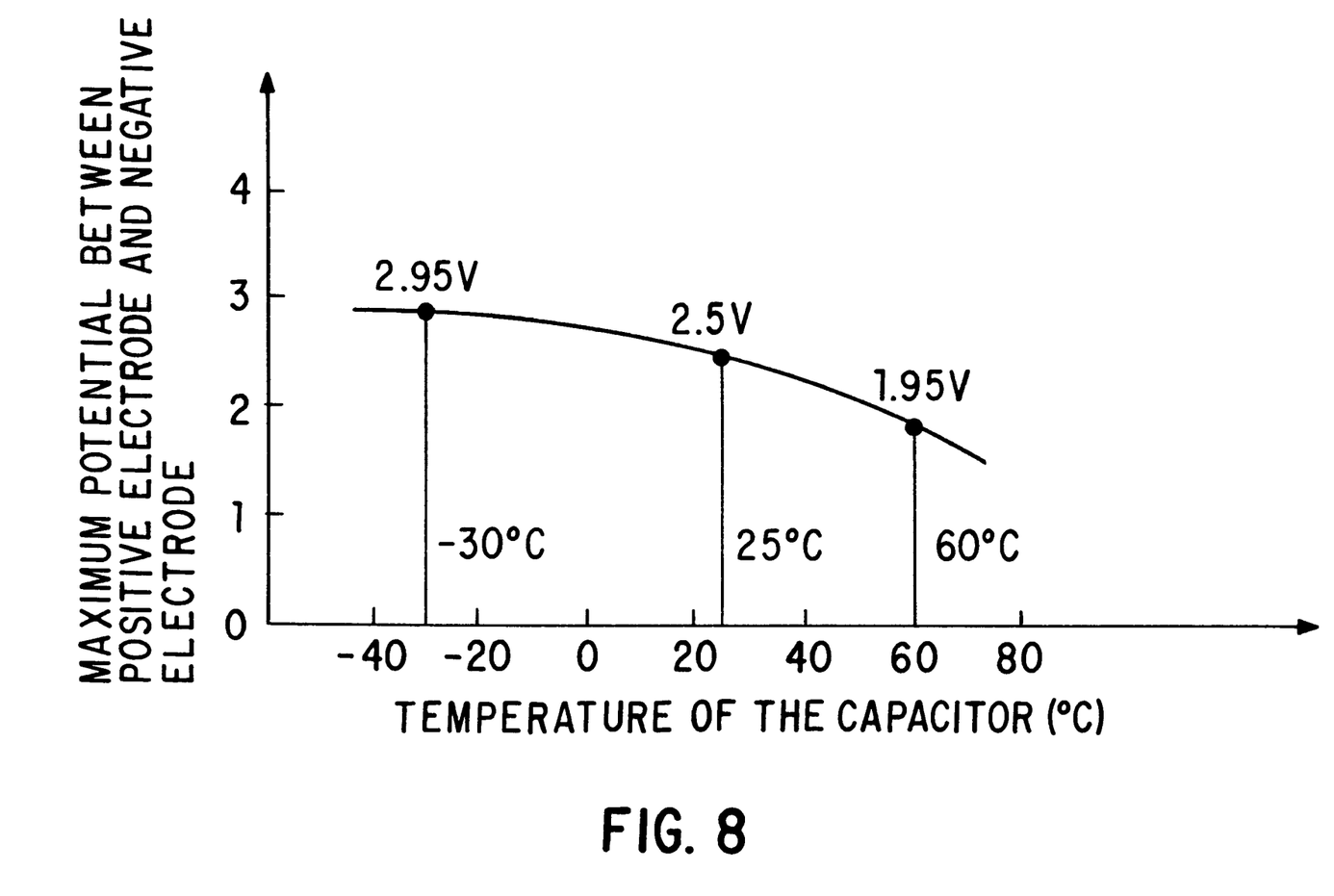
FIG. 8 shows the relationship between temperature of the capacitor (horizontal axis of the graph) and the maximum potential between the positive electrode and the negative electrode (vertical axis of the graph).

FIG. 8 shows the relationship between temperature of the capacitor and the maximum potential between the positive electrode and the negative electrode, and the control unit 4 stores this relationship. The control unit controls the electrical power source unit so as to not exceed the maximum potential between positive electrode and negative electrode when charging is executed. In FIG. 8, the horizontal axis of the graph indicates the temperature of the capacitor and vertical axis of the graph indicates the maximum potential between the positive electrode and the negative electrode. The maximum potential between the positive and negative electrode is set differently depending on the temperature of the capacitor. The maximum potential between the positive and negative electrode are determined by the following steps. As an example, the determination of the maximum potential between the positive and negative electrode at 60° C. is described. From FIG. 3, it is found out that the decomposition potential of the positive electrode is 0.55 V, and the decomposition potential of the negative electrode is −1.6 V, when temperature of the capacitor is 60° C. And as shown in FIG. 4, the decomposition potential of positive electrode, 0.55 V, and the decomposition potentials of negative electrode, −1.6 V, are plotted on the straight line (m) or (n), which shows the relationship between the stored charge Q and the positive potential or negative potential of the electric double layer capacitor. And both are compared with the value of horizontal axis of the graph, in other words, both charges are compared, and it is determined which electrode has a smaller charge at each decomposition potential. In this case, the value on the straight line (m) is chosen, and Q2 is chosen. The potentials, corresponding to the chosen charge, are determined. And the potential difference between the positive electrode and the negative electrode is determined as the maximum potential between the positive electrode and the negative electrode at temperature of the capacitor, 60° C. In this case, the positive potential and negative potential at Q2 are determined, and the maximum potential between the positive electrode and the negative electrode is determined as 1.95 V.

The same as the above mentioned, the maximum potential between the positive electrode and the negative electrode is determined at each temperature of the capacitor in the range of the operation temperature. And the relationship between temperature of the capacitor (horizontal axis of the graph) and the maximum potential between the positive electrode and the negative electrode (vertical axis of the graph) comes to FIG. 8. If the capacitor is charged, the stored charge will increase, and each respective potential of the positive electrode and the potential of the negative electrode will increase along with the straight line (m) and (n) as shown in FIG. 4. Except at the standard temperature of the capacitor, 25° C., either the potential of the positive electrode or negative electrode will reach the decomposition potential first. When the temperature of the capacitor is 60° C., and when the stored charge reaches Q2 during charging, the positive potential reaches the decomposition potential, 0.55 V, earlier than the negative decomposition potential. When the temperature of the capacitor is −30° C., and when the stored charge reaches Q3 during charging, the negative potential reaches the negative decomposition potential, −2.1 V, earlier than the positive potential. When one of the electrodes reaches the decomposition potential, the potential between the positive electrode and the negative electrode is at its maximum. And on the contrary, if charging is executed until the potential difference between the electrodes reaches its maximum, one of the electrodes will reach the decomposition potential. As a result, it is possible to get a maximum amount of charge energy with no irreversible current being caused. Based on this point of view, the control unit 4 controls the electrical power source unit 2. Next the operation of the first embodiment of the charger for the capacitor is explained. At the initiation of charging, the control unit 4 determines the maximum potential between the positive electrode and the negative electrode by using a map which is shown in FIG. 8 and using the temperature of the capacitor detected by the temperature sensor 8.

The control unit 4 sends an "ON" signal to the electrical power source unit 2 and turns on the main switch 2b. The electricity is provided to the capacitor 20 from the electrical power source unit 2a, and charging is executed. It is possible for the control unit 4 to control the electrical source power unit 2 while increasing the potential between the electrodes at the same rate. It is possible for the control unit 4 to control the electrical source power unit 2 while providing the maximum or approximately the same potential between the positive electrode and the negative electrode from the beginning. It is possible to control the electrical power source to provide some amount of the current to the capacitor while controlling the current value. At that time it is possible to fix the amount of the current. Which method, including the above mentioned and not mentioned, should be used during charging is being determined based on the specification of the capacitor 20. When charging is being executed, the stored charge will increase, and each of the potentials of the positive electrode and the negative electrode will increase along the straight line (m) and (n) as shown in FIG. 4. The control unit 4 observes the potential between the positive electrode and the negative electrode measured by the voltmeter 6. And when the potential between the positive electrode and the negative electrode reaches its maximum, the control unit 4 will finish charging. At this time, the control unit 4 sends an "OFF" signal to the electrical power source unit 2 and turns off the main switch 2b. Or, it is possible for the control unit 4 to keep the potential between the positive electrode and the negative electrode at the maximum.

During charging, because temperature of the capacitor is changing, the control unit 4 deals with the change of the temperature as follows. The control unit 4 observes the temperature of the capacitor measured by the temperature sensor while charging is executing. At each control cycle, the maximum potential between the positive electrode and the negative electrode is determined based on the actual temperature of the capacitor during charging, and the potential between the positive electrode and the negative electrode and the maximum potential between the positive electrode and the negative electrode are compared. When the potential between the positive electrode and the negative electrode reaches its maximum, charge will be finished. If the method, which provides the maximum or approximately the same potential between the positive electrode and the negative electrode to the capacitor from the beginning, is adopted, the maximum potential between the positive electrode and the negative electrode is changed based on the actual maximum potential determined by the control unit 4.

After the potential between the positive electrode and the negative electrode reaches its maximum, if the temperature of the capacitor rises, the decomposition potentials will decrease. Therefore, in such a case, the control unit 4 will control the electrical power source unit 2 and make the capacitor discharge. The potential between the positive electrode and the negative electrode will be decreased to the maximum potential between the positive electrode and the negative electrode corresponding to the change in temperature. On the contrary, after the potential between the positive electrode and the negative electrode reaches its maximum, if the temperature of the capacitor decreases, the decomposition potentials will increase. Therefore, in such a case, the control unit 4 will control the electrical power source unit 2 and continue to change the capacitor. The potential between the positive electrode and the negative electrode will be increased to its maximum corresponding to the change in temperature.

According to the first embodiment, at each temperature of the capacitor, it is possible for either the positive electrode or the negative electrode, which reaches the decomposition potential first, to increase the potential between the positive electrode and the negative electrode to the decomposition electrode. Therefore, it is possible for the amount of the storage of the energy to be the maximum. It is possible to avoid causing the irreversible current, and it is possible to charge the capacitor with larger energy at low temperature.

The following is the second embodiment. As shown FIG. 5 before, it was possible that the irreversible current will be caused, if the conventional charge is executed under the ratio of the capacitance of the positive electrode to the capacitance of the negative electrode is changed by the activated materials falling off. In this point, there is room of improvement for the first embodiment just like other conventional capacitors.

In the first embodiment, the maximum potential between the positive electrode and the negative electrode is set to 2.5 V at 25° C., temperature of the capacitor. But with the activated material falling off, as shown FIG. 5, the potential between the positive electrode and the negative electrode, which causes the irreversible current, will decrease. So, if charging is executed at 2.5 V, the positive potential will exceed the decomposition potential. As a result, the irreversible current is caused in the capacitor.

Figure 9:
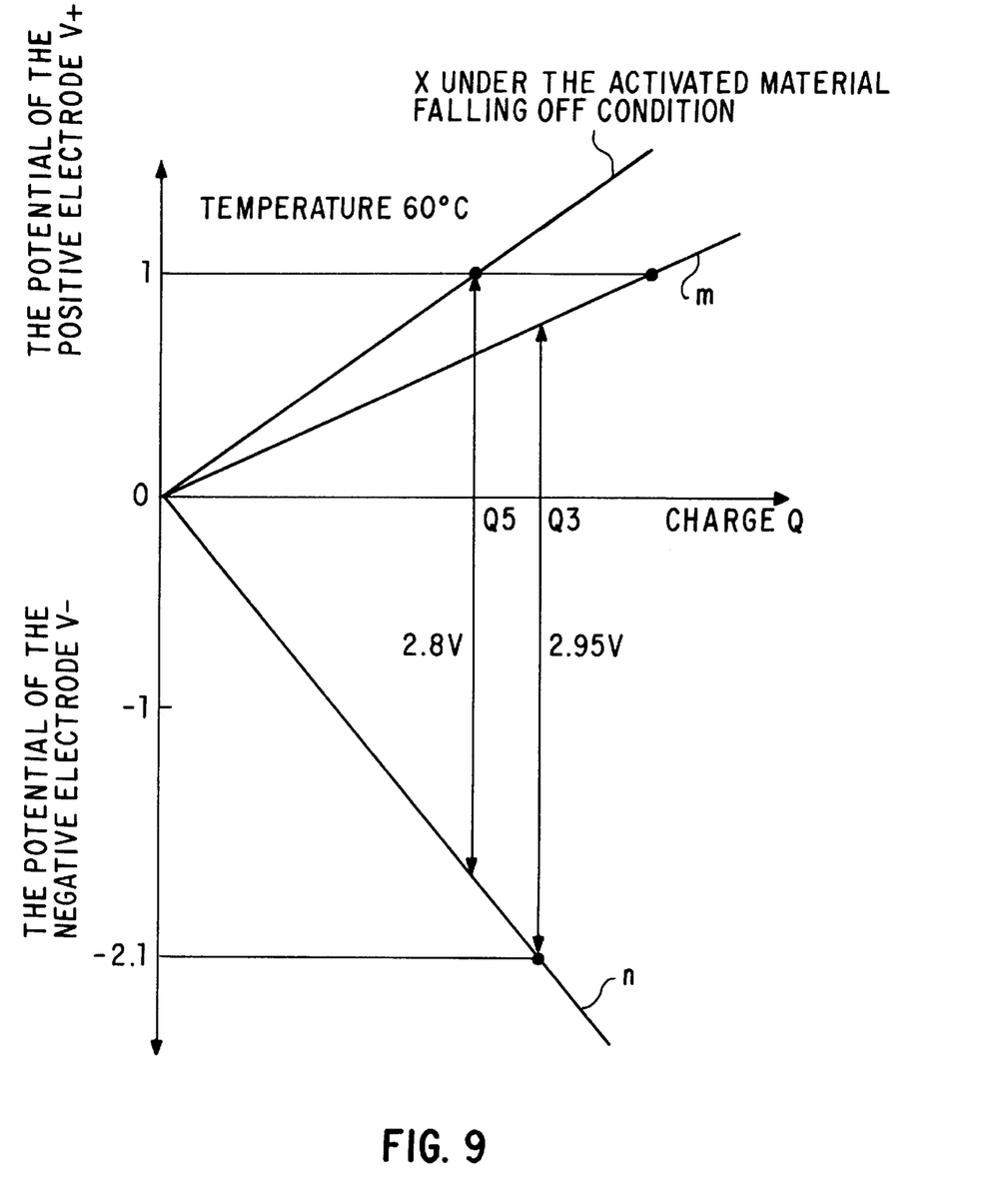
FIG. 9 shows the relationship between the stored charge Q (horizontal axis of the graph) and the positive potential or negative potential (vertical axis of the graph) when the ratio of the capacitance of the positive electrode to the capacitance of the negative electrode is changed.

The following is an explanation about the same point, at −30° C., temperature of the capacitor, which is above mentioned by using the first embodiment. FIG. 9, as FIG. 5, shows the relationship between the stored charge Q (horizontal axis of the graph) and the positive potential or negative potential (vertical axis of the graph) of the electrical double layer capacitor.

FIG. 5 shows the relationship between the stored charge Q (horizontal axis of the graph) and the positive potential or negative potential (vertical axis of the graph) of the electrical double layer capacitor. Before the activated material falls off, the relationship between stored charge Q and the positive potential is the straight line (m), which is the same as FIG. 2 and 4. But after the activated material falls off, the relationship between stored charge Q and the positive potential is changed to the straight line (x). Because the capacitance decreases, the slope of the straight line (x) is larger than the slope of the straight line (m). In FIG. 9, values, corresponding to the decomposition potentials at −30° C. of temperature of the capacitor, are plotted on the straight lines (m), (n), (x). The values on the straight line (m) and (n) are the same as in FIG. 4. In the first embodiment, at −30° C., the maximum potential between the positive electrode and the negative electrode is set 2.95 V. So, when the potential between the positive electrode and the negative electrode reaches 2.95 V, charging will finish. At this time, according to FIG. 9, the negative potential reaches the decomposition potential, −2.1V, first. But after the activated material falls off, if the potential between the positive electrode and the negative electrode reaches 2.8 V, the positive potential reaches the decomposition potential, 1.0 V, earlier than the negative electrode. Therefore, if charging is executed the same as the first embodiment, the positive potential will exceed the decomposition potential. Because this embodiment controls the potential between the positive electrode and the negative electrode, it cannot cope with the change in the ratio of the capacitance of the positive electrode to the capacitance of the negative electrode. Therefore in the second embodiment, the positive potential and negative potential are controlled instead of the potential between the positive electrode and the negative electrode.

Figure 10:
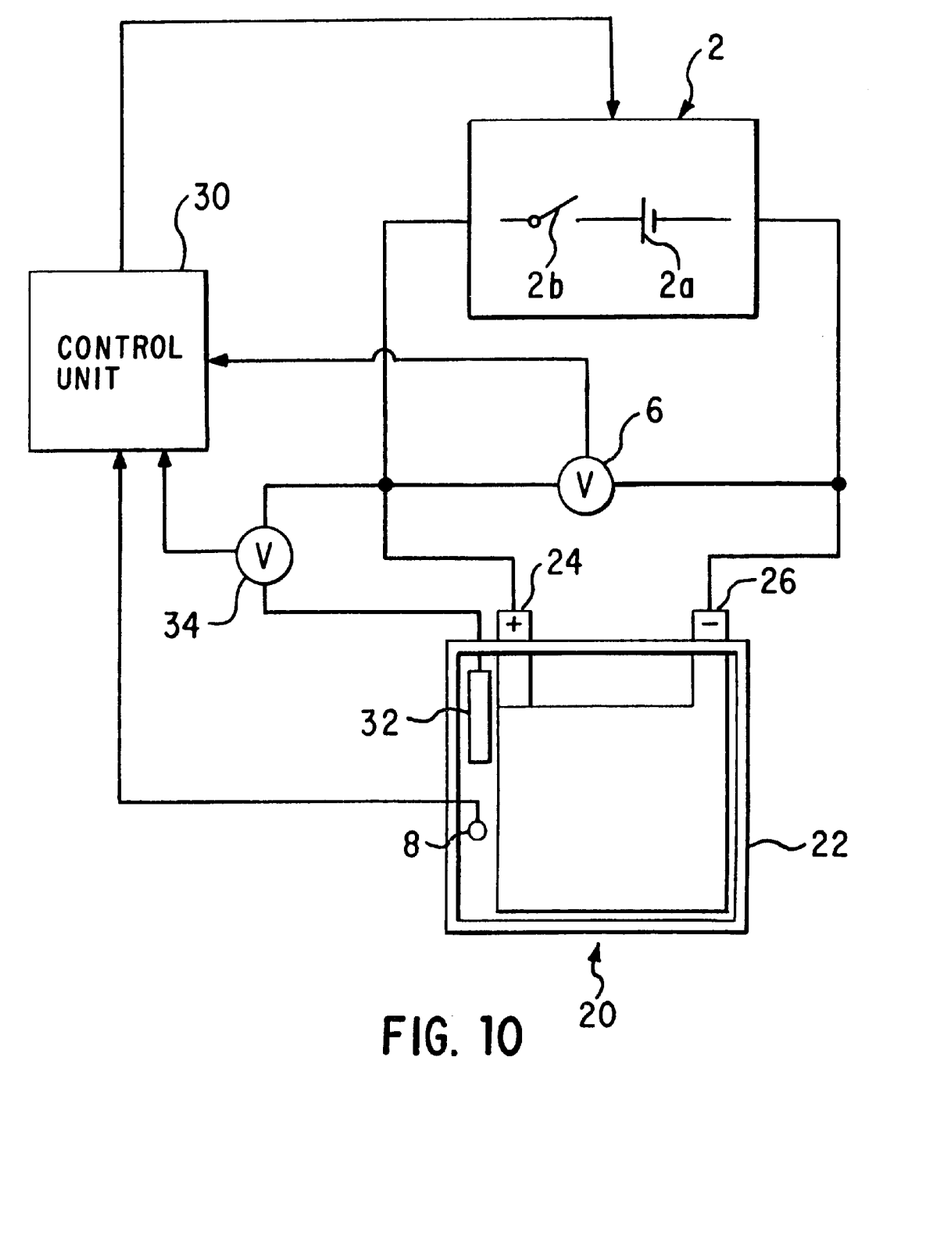
FIG. 10 shows the construction of a charger for a capacitor corresponding to the second embodiment.

FIG. 10 shows the construction of a charger for a capacitor corresponding to the second embodiment. In FIG. 10, the same parts which have already shown in FIG. 6, the first embodiment, are marked with the same number, and the explanation about them is omitted. The feature of the second embodiment is that there is a reference electrode 32 and a positive electrode voltmeter 34. The reference electrode is a Ag/Ag+ electrode, and it is sunk in the electrolyte filled in the cell case 22. The reference electrode 32 is set as to not contact any part of the cell case 22, nor with the positive electrode or the negative electrode. The potential of the reference against the electrolyte is maintained at a constant potential α, and this potential α is used as the correction potential. The potential between the positive electrode 24 and the reference electrode 32 is measured by the positive voltmeter 34. A calomel electrode is available for the reference electrode instead of the Ag/Ag+ electrode. And the metal foil is also available for the reference electrode, and furthermore, the cell case 22 (metallic character) is available. The potential between the electrolyte and the selected material is used as the correction potential α. The control unit 30 subtracts the correction potential α from the potential between the positive electrode 24 and the reference electrode 32, which is measured by the positive voltmeter 34. The control unit 30 gets the potential of the positive electrode V+. And the control unit 30 subtracts the potential of the positive electrode from the potential between the positive electrode and 24 the negative electrode 26, which is measured by the voltmeter 6. The control unit 30 gets the potential of the negative electrode V−. The control unit 30 controls the electrical power source unit 2 based on the potential of the positive electrode, the potential of the negative electrode, and temperature of the capacitor measured by the temperature sensor 8.

The control unit 30 memorizes the temperature characteristic curve of the positive electrode and the temperature characteristic curve of the negative electrode, in other words, the decomposition of the positive electrode and the negative electrode at each temperature, which are shown in FIG. 3. The control unit 30 controls the electrical power source unit 2 so that the potential of the positive electrode and the potential of the negative electrode do not exceed their respective decomposition potentials at the detected temperature of the capacitor.

Next the operation of the second embodiment of the charger for the capacitor is explained. At the initiation of charging, the control unit 30 sends an "ON" signal to the electrical power source unit 2 and turns on the main switch 2b. The electricity is provided to the capacitor 20 from the electric power source unit 2a, and charging is executed. It is possible for the control unit 30 to control the electrical source power unit 2 while increasing the potential between electrodes at the same rate. It is possible for the control unit 30 to control the electrical source power unit 2 while providing the maximum or approximately the same potential between the positive electrode and the negative electrode from the beginning. It is possible to control the electrical source power to provide some amount of the current to the capacitor while controlling the current value. At that time, it is possible to fix the amount of the current. Which method, including the above mentioned and not mentioned, should be used during charging is determined based on the specification of the capacitor 20. When charging is being executed, the stored charge will increase, and each the potential of the positive electrode and the negative electrode will increase. The control unit 30 observes the temperature of the capacitor measured by the temperature sensor 8 while charging is executing. At each control cycle, the decomposition potential of the positive electrode and the decomposition potential of the negative electrode are determined based on the actual temperature of the capacitor during charging. And the potential of the positive electrode V+ and the potential of the negative electrode V− are determined based on the outputs from the voltmeter 6 and the voltmeter of the positive electrode 34. The potential of the positive electrode V+, the potential of the negative electrode V−, the decomposition potential of the positive electrode, and the decomposition potential of the negative electrode are compared with each other. At first, both the potential of the positive electrode and the potential of the negative electrode are smaller than the decomposition potentials. During charging, if it is detected that at least one of the potentials of the positive electrode or the negative electrode reaches its respective decomposition potential, the control unit 30 stops charging. The control unit 30 sends an "OFF" signal; the main switch 2b will turn off and stop charging. Or, it is possible for the control unit 30 to maintain the decomposition potential of positive electrode or the negative electrode, which reaches its respective decomposition potential first.

The control unit 30, which is the same as the control unit 4 in the first embodiment, is able to discharge corresponding to the temperature of the capacitor increasing after charging. On the contrary, after charging, if the temperature of the capacitor decreases, the control unit 30 will control the electrical power source unit 2 and continue to charge the capacitor.

Next, the example of the actual operation is explained with reference to FIG. 9. If the capacitor is charged, the stored charge will increase, and each of the potentials of the positive electrode and the negative electrode will increase. Usually, when the activated materials do not fall off, the potential of the positive electrode and the negative electrode will increase along the straight line (m) and (n) shown in FIG. 9. When the stored charge reaches Q3 during charging, the control unit 30 will detect that the potential of the negative electrode reached the decomposition potential at −30° C., and will stops charging. When the stored charge reaches Q3 during charging, the negative potential will reach the decomposition potential, −2.1 V, earlier than the positive potential. When one of the electrodes reaches its decomposition potential, the potential between the positive electrode and the negative electrode is at its maximum. And on the contrary, if charging is executed until the potential difference between electrodes reaches its maximum, one of the electrodes will reach its decomposition potential. As a result, it is possible to get a maximum amount of the charging energy with no irreversible current being caused. Based on this point of view, the control unit 4 controls the electric power source unit 2. The potential between the positive electrode and the negative electrode becomes 2.95 V. So, usually, it is possible to charge at the same potential between the positive electrode and the negative electrode as in the first embodiment.

If the activated material falls off, and after the activated material falls off, if charging is executed, the positive potential is changed corresponding to the straight line (x). When the charge reaches the charge Q5, the control unit 30 will detect that the positive potential reached its decomposition potential, 1.0 V, at −30° C., and will stop charging. At this time, the potential between the positive electrode and the negative electrode of the capacitor is 2.8 V. The potential between the positive electrode and the negative electrode will be smaller if the activated material falls off. But this potential, 2.8 V, between the positive electrode and the negative electrode, is the maximum potential which is not in excess of the decomposition potential of the positive electrode under the activated material falling off condition.

Usually, the first embodiment and the second embodiment have the same effect. At each temperature of the capacitor, charging is executed until the decomposition potential. At a high temperature of the capacitor, it is possible to avoid causing the irreversible current. At low temperature of the capacitor, it is possible to charge the capacitor with a larger energy. And even if the capacitance is changed by such as the activated material falling off, it is possible to avoid causing the irreversible current. And under the capacitance changed condition, until it is detected that at least one of the potentials of the positive electrode and the negative electrode has reached decomposition potential, the control unit continues to charge the capacitor. In other words, under the capacitance changed condition, it is possible to charge the capacitor with the maximum energy that does not cause the irreversible current.

As a result, using the present invention, it is possible to make the capacitor applicable to an electrical device or an electrical vehicle small.

In the second embodiment, the potential of the electrolyte is used as the standard potential for the potential of the positive electrode and the potential of the negative electrode. But it is possible to use other potentials as the standard potential.

And it is possible to use each absolute value for the potential of the positive electrode and the potential of the negative electrode.

In the second embodiment, it is possible to set a limit potential of the positive electrode based on the decomposition potential of the positive electrode and to set a limit potential of the negative electrode based on the decomposition potential of the negative electrode. The limit potentials are set to the same value of the decomposition potentials or the limit potentials are set to smaller values than the decomposition potentials. In this case, the limit potentials of the positive electrode and the negative electrode are used as the standard for the control.

For example, in FIG. 4, at 60° C., the decomposition potential of the positive electrode is 0.55 V and the decomposition potential of the negative electrode is −1.6 V. The limit potential of the positive electrode and the limit potential of the negative electrode are set based on the decomposition potentials. It is possible to set the maximum potentials the same as the decomposition potentials. It is possible to set the maximum potentials smaller than the decomposition potentials. Any way, the maximum potentials are set based on the decomposition potentials. At each temperature of the capacitor, the limit potentials are set the same way. The control unit 30 will stop charging when one of the potentials reaches the maximum potential. During charging, with no irreversible current being caused, it is possible to make the stored energy large at a high temperature of the capacitor. When the control unit 30 stops charging, it is possible to stop providing the capacitor with electricity, or it is possible to maintain the potential between the positive electrode and the negative electrode, which is called the maintaining mode. And even if the activated materials falls off by any cause, it is possible to avoid causing irreversible current. As shown in FIG. 5, the relationship between the stored charge and the positive potential or negative potential is changed. The potential between the positive electrode and the negative electrode is changed when one of the potentials reaches the decomposition potential. So, if charging is executed based on controlling the potential between the positive electrode and the negative electrode, it is possible to cause the irreversible current. But the decomposition potential of the positive electrode and the decomposition potential of the negative electrode are characteristic values determined electrochemically, and they are unchangeable even if the activated material falls off. By using this embodiment, the potential of the positive electrode and the potential of the negative electrode are measured, and the positive electrode and the negative electrode are controlled under each of the limit potentials. And even if the capacitance is changed by such as the activated material falling off, it is possible to avoid causing the irreversible current.

And under the capacitance changed condition, until it is detected that at least one of the potentials of the positive electrode and the negative electrode has reached the limit potential, the control unit continues to charge the capacitor. In other words, under the capacitance changed condition, it is possible to charge the capacitor with the maximum energy that does not cause the irreversible current.

And in the first embodiment, it is possible to set the limit potential between the positive electrode and the negative electrode based on the maximum potential between the positive electrode and the negative electrode.

For example, in FIG. 4, when the temperature of the capacitor is 60° C., and when the positive potential reaches the decomposition potential of positive, the potential between the positive electrode and the negative electrode is 1.95 V. So, the maximum potential between the positive electrode and the negative electrode is set based on the 1.95 V, at 60 60° C. It is possible to set the maximum potential between the positive electrode and the negative electrode the same as 1.95 V. It is possible to set the maximum potential between the positive electrode and the negative electrode smaller than 1.95 V.

Anyway, the maximum potential between the positive electrode and the negative electrode is set based on the decomposition potential. At each temperature of the capacitor, the limit potential between the positive electrode and the negative electrode is set the same way. The control unit 4 will stop charging when the potential between the positive electrode and the negative electrode reaches the maximum potential between the positive electrode and the negative electrode. During charging, with no irreversible current being caused, it is possible to make the stored energy large at a high temperature of the capacitor. When the control unit 4 finishes charging, it is possible to stop providing the capacitor with electricity, or it is possible to maintain the potential between the positive electrode and the negative electrode, which is called a maintaining mode.

Concerning the source of the electricity, it is possible to use an electrical power source, which stores electricity, and it is possible to use the device that provides the capacitor with electricity sent outside of the device. A generator is available. A motor is available during regenerative braking. Using a generator or a motor as the source of the electricity is desirable for an electrical vehicle.

What is claimed is:

1. A charger which provides a capacitor with electricity and charges the capacitor, comprising:

a decomposition potential detector which detects a decomposition potential of a positive electrode of the capacitor and a decomposition potential of a negative electrode; and a controller which stops charging the capacitor when at least one of the potentials of the positive electrode or the negative electrode reaches its respective decomposition potential.

2. The charger according to claim 1, wherein the decomposition potential detector includes a temperature sensor sensing a temperature of the capacitor; and a memory which stores a temperature characteristic of the positive electrode and the negative electrode; and the detector detects the decomposition potential of the positive electrode and the decomposition potential of the negative electrode based on data of the temperature sensor and the memory.

3. The charger according to claim 1, wherein the capacitor includes a pair of collectors; and a polarized positive electrode is disposed on one of the collectors and a polarized negative electrode is disposed on the other collector; and a separator is interposed between the polarized positive electrode and the polarized negative electrode; and an electrolyte is applied between the polarized positive and negative electrodes and the separator; and wherein a ratio of a capacitance of the polarized positive electrode to a capacitance of the polarized negative electrode is determined in accordance with a potential of the polarized positive electrode and a potential of the polarized negative electrode which causes an irreversible current.

4. The charger according to claim 3, wherein the ratio of the capacitance depends upon a ratio of constituents of the polarized positive electrode to constituents of the polarized negative electrode.

5. A charger which provides a capacitor with electricity and charge the capacitor, comprising;

a voltmeter which detects a potential between a positive electrode and a negative electrode of the capacitor; and a memory which stores a maximum potential, which is a maximum potential between the positive electrode and the negative electrode determined based on a decomposition potential one of the electrodes reaches; and a controller which stops charging the capacitor when the potential between the positive electrode and the negative electrode reaches the maximum potential between the positive electrode and the negative electrode.

6. The charger according to claim 5, further comprising:

a temperature sensor which detects a temperature of the capacitor; and wherein the memory stores the temperature characteristic of the positive electrode and the temperature characteristic of the negative electrode; and a maximum potential detector which determines a maximum potential between the positive electrode and the negative electrode based on data of the temperature sensor and the memory.

7. The charger according to claim 5, wherein the capacitor includes a pair of collectors; and a polarized positive electrode is disposed on one of the collectors and a polarized negative electrode is disposed on the other collector; and a separator is interposed between the polarized positive electrode and the polarized negative electrode; and an electrolyte is applied between the polarized positive and negative electrodes and the separator; and wherein a ratio of a capacitance of the polarized positive electrode to a capacitance of the polarized negative electrode is determined in accordance with a potential of the polarized positive electrode and a potential of the polarized negative electrode which causes an irreversible current.

8. The charger according to claim 7, wherein a ratio of the capacitance depends upon a ratio of constituents of the polarized positive electrode to constituents of the polarized negative electrode.

9. A charger which provide a capacitor with electricity and charges the capacitor, comprising:

a temperature sensor which detects a temperature of the capacitor; and a controller which determines a decomposition potential for at least one of a positive electrode and a negative electrode based on a temperature characteristic and temperature, and controls provision of electricity to the capacitor so that potentials of the positive electrode and the negative electrode do not exceed their respective decomposition potential.

10. The charger according to claim 9, further comprising:

a voltmeter which detects a potential between a positive electrode and a negative electrode; and a memory which stores a maximum potential, which is a maximum potential between the positive electrode and the negative electrode which is determined based on a temperature characteristic of the decomposition potentials, and the temperature of the capacitor; and a maximum potentials detector which detects the maximum potential between the positive electrode and the negative electrode based on data of the temperature sensor and the memory; and a controller which stops charging the capacitor when the potential between the positive electrode and the negative electrode reaches the maximum potential between the positive electrode and the negative electrode.

11. The charger according to claim 9, further comprising:

a temperature sensor sensing a temperature of the capacitor; and a memory which stores a temperature characteristic of the positive electrode and a temperature characteristic of the negative electrode; and a decomposition potential detector which detects the decomposition potential of the positive electrode of the capacitor and the decomposition potential of the negative electrode based on data of the temperature sensor and the memory; and a controller which stops charging the capacitor when at least one of the potentials of the positive electrode or the negative electrode reaches its respective decomposition potential.

12. The charger according to claim 9, wherein the capacitor includes a pair of collectors; and a polarized positive electrode is disposed on one of the collectors and a polarized negative electrode is disposed on the other collector; and a separator is interposed between the polarized positive electrode and the polarized negative electrode; and an electrolyte is applied between the polarized positive and negative electrodes and the separator; and wherein a ratio of a capacitance of the polarized positive electrode to a capacitance of the polarized negative electrode is determined in accordance with a potential of the polarized positive electrode and a potential of the polarized negative electrode which causes an irreversible current.

13. The charger according to claim 10, wherein the capacitor includes a pair of collectors; and a polarized positive electrode is disposed on one of the collectors and a polarized negative electrode is disposed on the other collector; and a separator is interposed between the polarized positive electrode and the polarized negative electrode; and an electrolyte is applied between the polarized positive and negative electrodes and the separator; and wherein a ratio of a capacitance of the polarized positive electrode to a capacitance of the polarized negative electrode is determined in accordance with a potential of the polarized positive electrode and a potential of the polarized negative electrode which causes an irreversible current.

14. The charger according to claim 11, wherein the capacitor includes a pair of collectors; and a polarized positive electrode is disposed on one of the collectors and a polarized negative electrode is disposed on the other collector; and a separator is interposed between the polarized positive electrode and the polarized negative electrode; and an electrolyte is applied between the polarized positive and negative electrodes and the separator; and wherein a ratio of a capacitance of the polarized positive electrode to a capacitance of the polarized negative electrode is determined in accordance with a potential of the polarized positive electrode and a potential of the polarized negative electrode which causes an irreversible current.

15. A method for charging a capacitor, comprising the steps of:

detecting a decomposition potential of the positive electrode of the capacitor and a decomposition potential of the negative electrode; and stopping charging of the capacitor when at least one of the potentials of the positive electrode and the potential of the negative electrode reaches its respective decomposition potential.

16. The method for according to claim 15, further comprising steps of:

detecting a temperature of the capacitor; and determining the decomposition potential of the positive electrode and the decomposition potential of the negative electrode based on the temperature and the temperature characteristics stored in a memory.

17. A method for charging a capacitor, comprising; the steps of:

detecting a potential between a positive electrode and a negative electrode; and detecting a maximum potential between the positive electrode and the negative electrode based on a decomposition potential of one of the electrodes; and completing charging the capacitor when a potential between the positive electrode and the negative electrode reaches a maximum.

18. The method according to claim 17, further comprising steps of:

detecting a temperature of the capacitor; and determining a maximum potential between the positive electrode and the negative electrode based on the temperature and stored temperature characteristics.

19. A method for charging a capacitor, comprising steps of:

detecting temperature of the capacitor; and determining a decomposition potential at least one of a positive electrode and a negative electrode based on a temperature characteristic and temperature; and providing the capacitor with the electricity so that the potential of the positive electrode or the negative electrode does not exceed its respective decomposition potential.

* * * * *